(12) United States Patent
Felten et al.

(10) Patent No.: US 9,129,235 B2
(45) Date of Patent: Sep. 8, 2015

(54) SYSTEM FOR USE IN A MOTOR VEHICLE, AND METHOD FOR EXAMINING GOODS

(75) Inventors: Matthias Felten, Nürnberg (DE); Hans-Wilhelm Ruehl, Solms (DE)

(73) Assignee: Continental Automotive GmbH, Hannover (DE)

( * ) Notice: Subject to any disclaimer, the term of this patent is extended or adjusted under 35 U.S.C. 154(b) by 647 days.

(21) Appl. No.: 13/063,264

(22) PCT Filed: Sep. 8, 2009

(86) PCT No.: PCT/EP2009/061609
§ 371 (c)(1),
(2), (4) Date: Jun. 23, 2011

(87) PCT Pub. No.: WO2010/029063
PCT Pub. Date: Mar. 18, 2010

(65) Prior Publication Data
US 2011/0257878 A1    Oct. 20, 2011

(30) Foreign Application Priority Data
Sep. 11, 2008  (DE) .......................... 10 2008 046 714

(51) Int. Cl.
*G01C 21/00* (2006.01)
*G06Q 10/06* (2012.01)

(52) U.S. Cl.
CPC ..................................... *G06Q 10/06* (2013.01)

(58) Field of Classification Search
CPC ....... G06Q 30/02; G06Q 30/06; G01Q 10/08; G01C 21/00
USPC ................. 701/400, 426, 447, 411, 412, 423; 705/26.1, 27.1, 26.7, 14.49, 21, 29
See application file for complete search history.

(56) References Cited

U.S. PATENT DOCUMENTS

| | | | |
|---|---|---|---|
| 6,587,835 B1 * | 7/2003 | Treyz et al. ................. | 705/14.64 |
| 7,084,767 B2 | 8/2006 | Hasegawa et al. | |
| 8,239,276 B2 * | 8/2012 | Lin et al. ...................... | 705/26.1 |
| 2002/0044084 A1 | 4/2002 | Itoh et al. | |
| 2002/0165009 A1 * | 11/2002 | Nohara et al. ................ | 455/558 |
| 2004/0004119 A1 | 1/2004 | Baldassari et al. | |
| 2004/0093274 A1 * | 5/2004 | Vanska et al. ................... | 705/26 |
| 2004/0103034 A1 * | 5/2004 | Reade et al. .................... | 705/16 |

(Continued)

FOREIGN PATENT DOCUMENTS

| | | |
|---|---|---|
| CN | 101044495 | 9/2007 |
| EP | 1 467 305 | 10/2004 |

(Continued)

*Primary Examiner* — John R Olszewski
*Assistant Examiner* — Truc M Do
(74) *Attorney, Agent, or Firm* — Cozen O'Connor

(57) ABSTRACT

A system for use in a motor vehicle wherein a navigation system and a control unit. The control unit is designed such that, using a list of goods stored in the control unit, a route of stops for purchasing the goods which can be depicted by the navigation system is produced. Furthermore, a near-field receiver and/or near-field transponder for detecting goods is present in the motor vehicle and can be or is connected to the control unit such that an additional list having detected goods can be transmitted to the control unit and the stored list can be updated by the additional list. A dynamic examination and possibly a dynamic adaptation of the route for purchasing the various goods depicted in the navigation system are thus possible.

8 Claims, 6 Drawing Sheets

(56) References Cited

U.S. PATENT DOCUMENTS

| | | | |
|---|---|---|---|
| 2004/0128069 A1* | 7/2004 | Cato et al. | 701/209 |
| 2004/0260465 A1* | 12/2004 | Tu | 701/209 |
| 2004/0263334 A1* | 12/2004 | Hasegawa et al. | 340/572.1 |
| 2005/0177446 A1* | 8/2005 | Hoblit | 705/26 |
| 2006/0047425 A1* | 3/2006 | Fukumi et al. | 701/209 |
| 2006/0059049 A1* | 3/2006 | Morris et al. | 705/26 |
| 2006/0273167 A1 | 12/2006 | Baldassari et al. | |
| 2007/0000990 A1 | 1/2007 | Baldassari et al. | |
| 2007/0012602 A1 | 1/2007 | Baldassari et al. | |
| 2007/0094080 A1* | 4/2007 | Wiken | 705/14 |
| 2007/0150369 A1* | 6/2007 | Zivin | 705/26 |
| 2007/0235529 A1* | 10/2007 | Peters | 235/383 |
| 2007/0236338 A1 | 10/2007 | Maruyama | |
| 2008/0154720 A1* | 6/2008 | Gounares et al. | 705/14 |
| 2008/0249838 A1* | 10/2008 | Angell et al. | 705/10 |
| 2008/0249856 A1* | 10/2008 | Angell et al. | 705/14 |
| 2008/0249858 A1* | 10/2008 | Angell et al. | 705/14 |
| 2009/0012882 A1 | 1/2009 | Sarangapani et al. | |
| 2009/0319182 A1* | 12/2009 | Monteverde | 701/209 |
| 2011/0178863 A1* | 7/2011 | Daigle | 705/14.31 |

FOREIGN PATENT DOCUMENTS

| | | |
|---|---|---|
| JP | 2003308409 | 10/2003 |
| JP | 2008 133085 | 6/2008 |
| WO | WO 2008/109542 | 9/2008 |

* cited by examiner

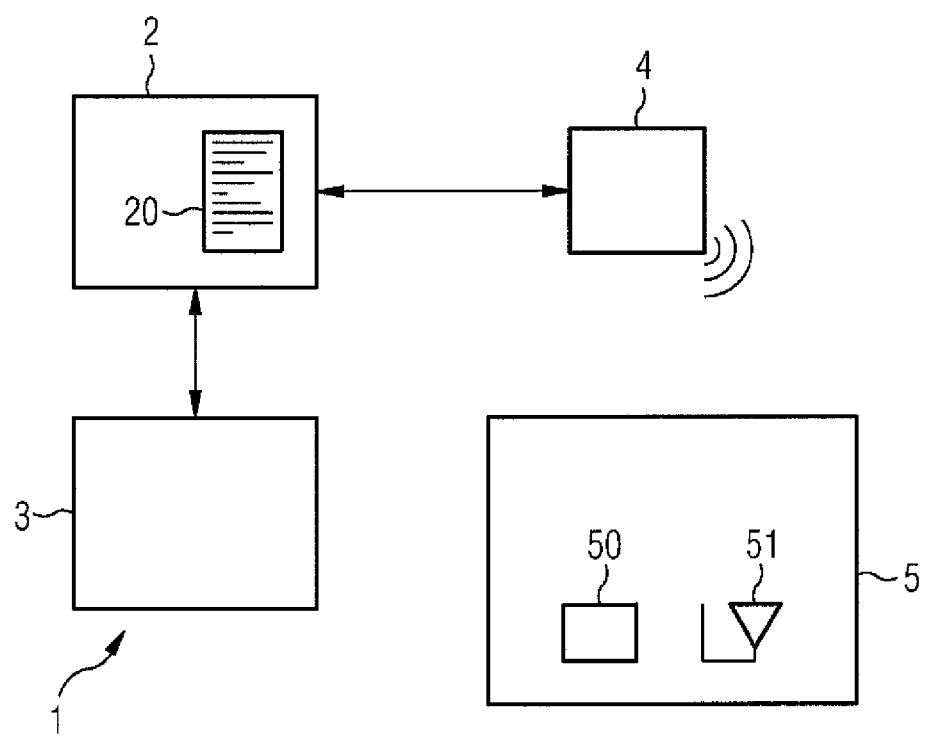

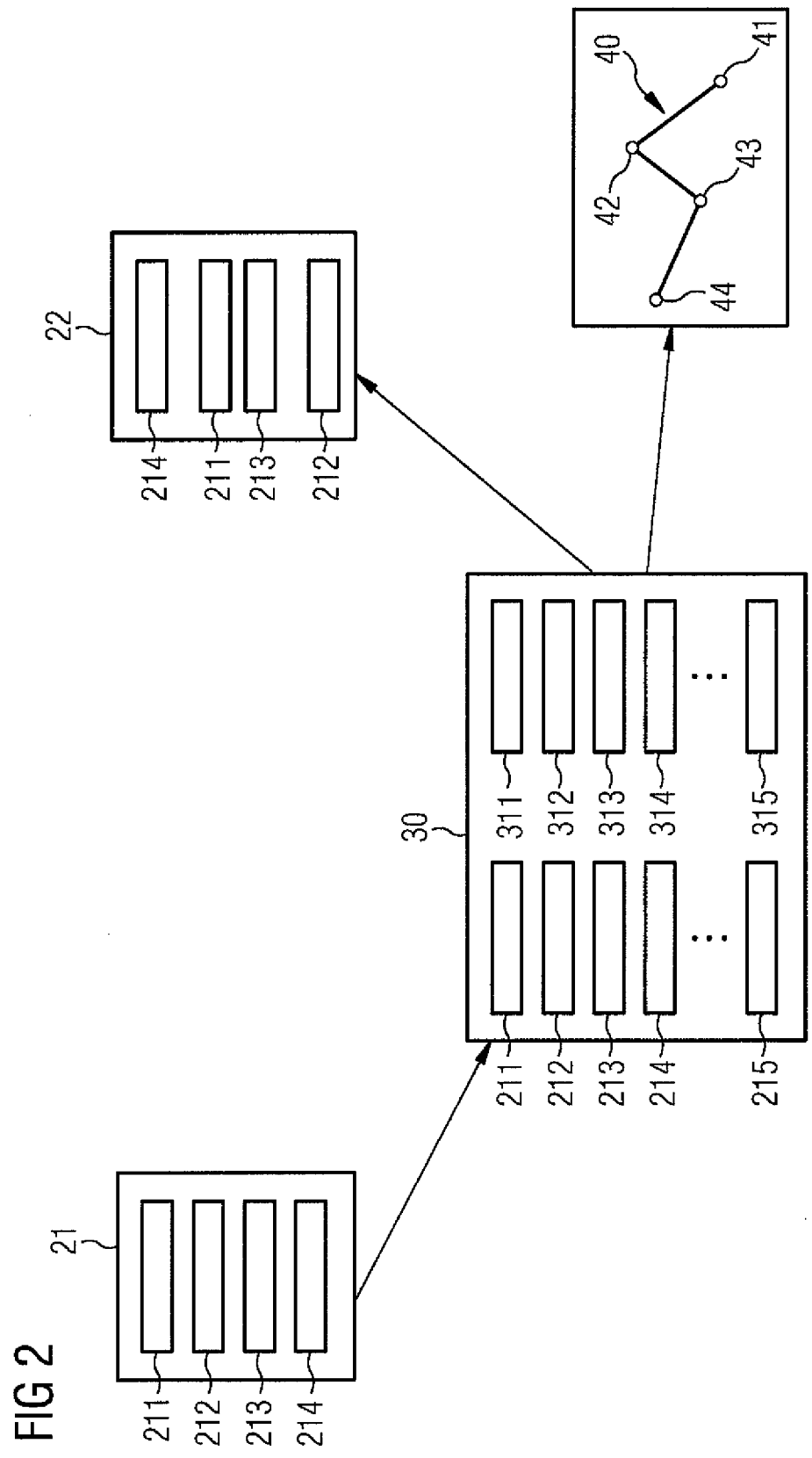

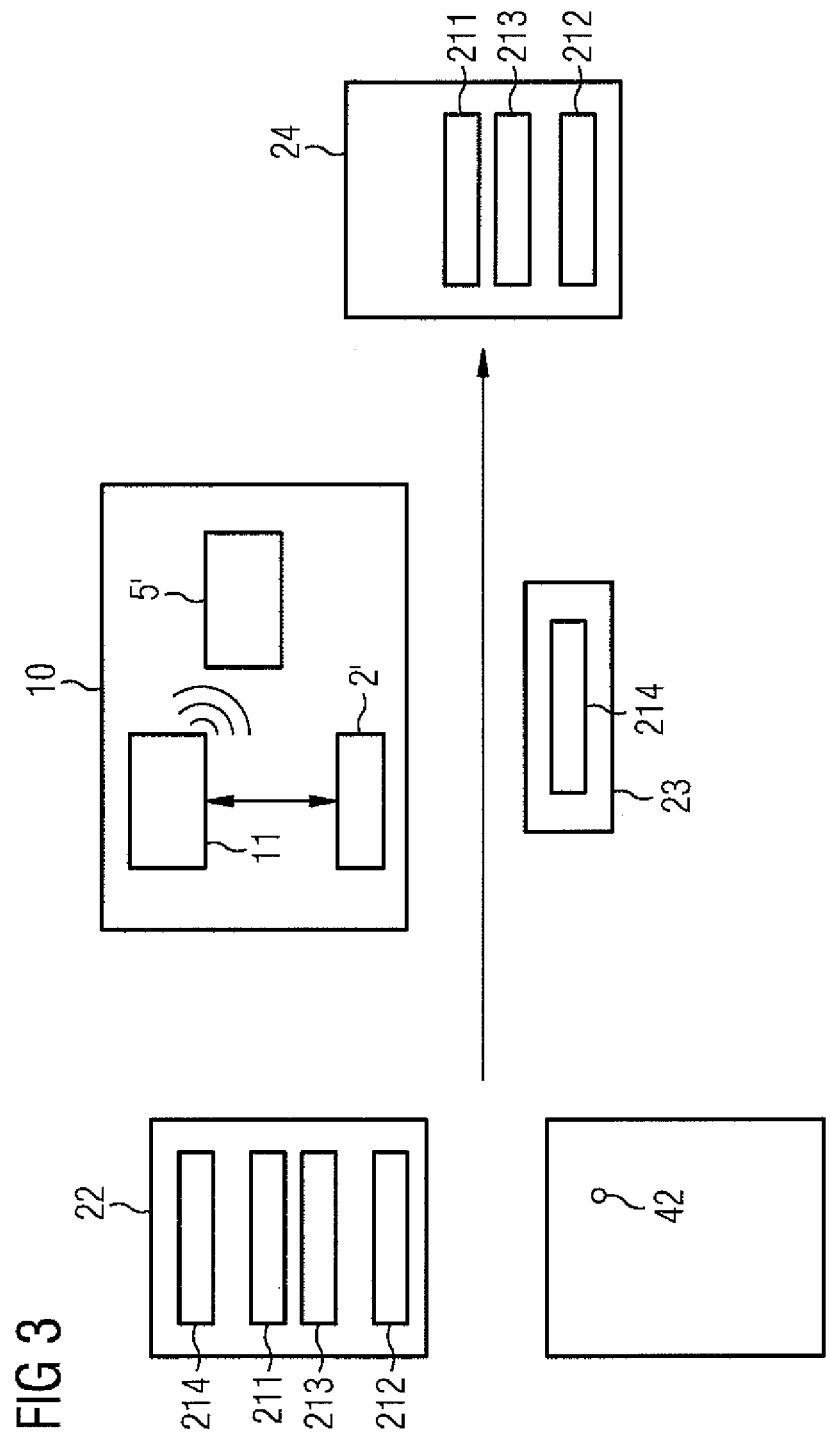

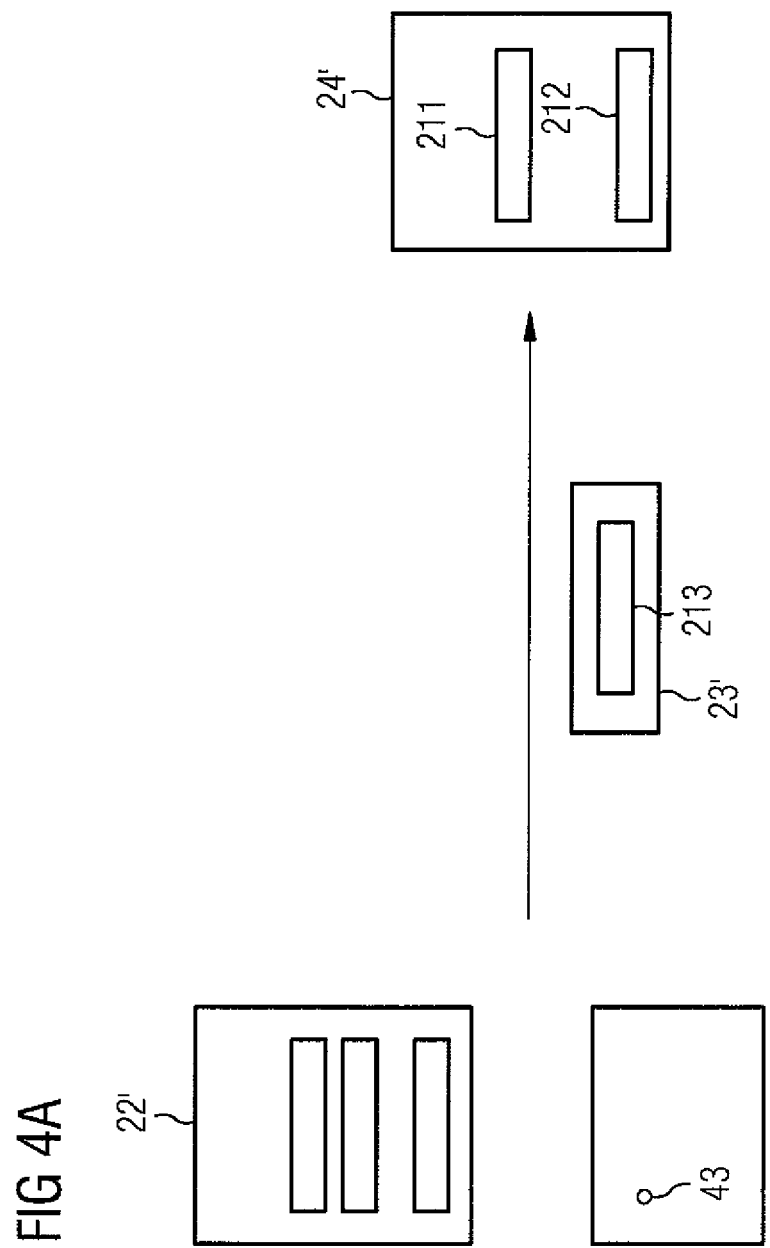

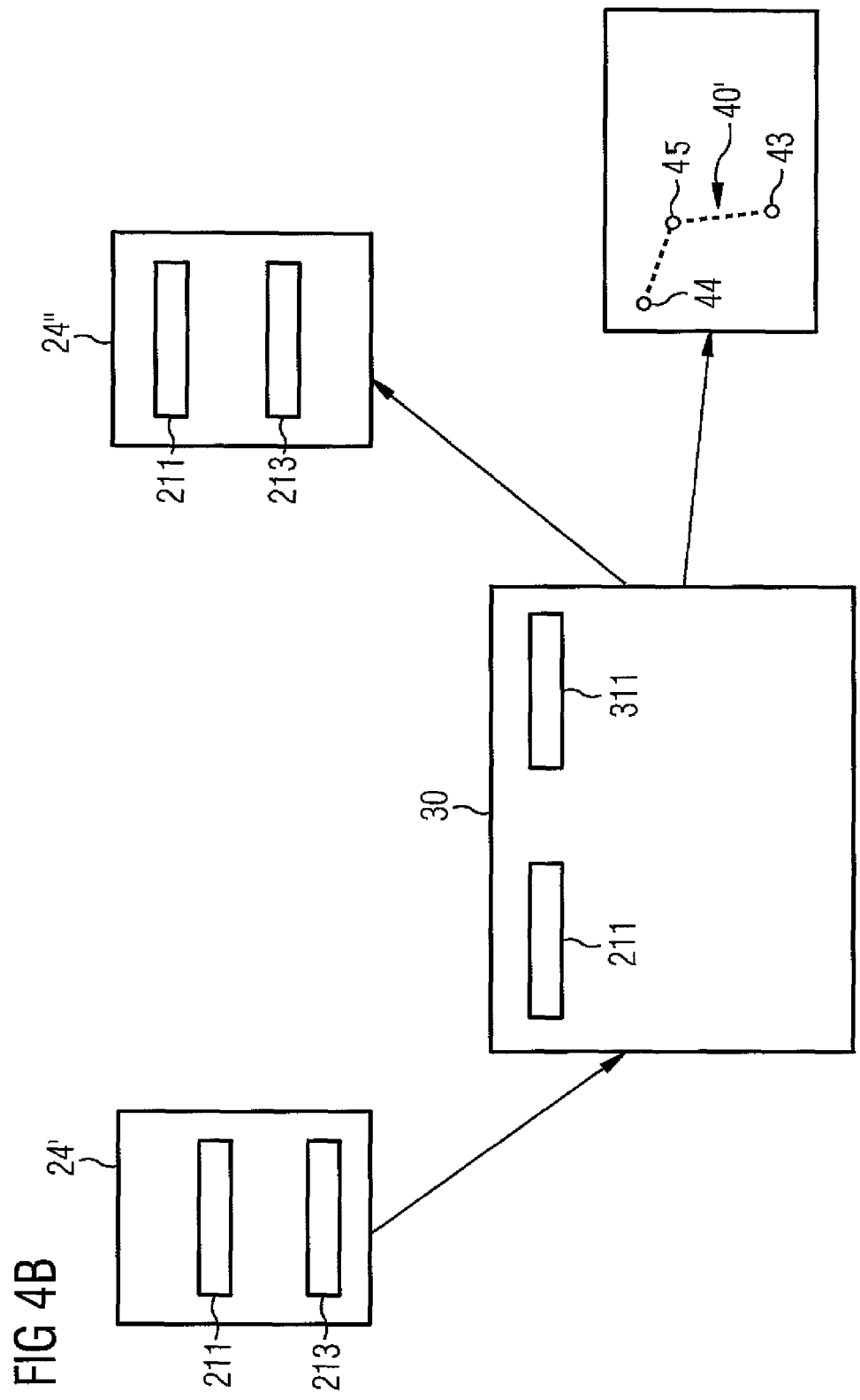

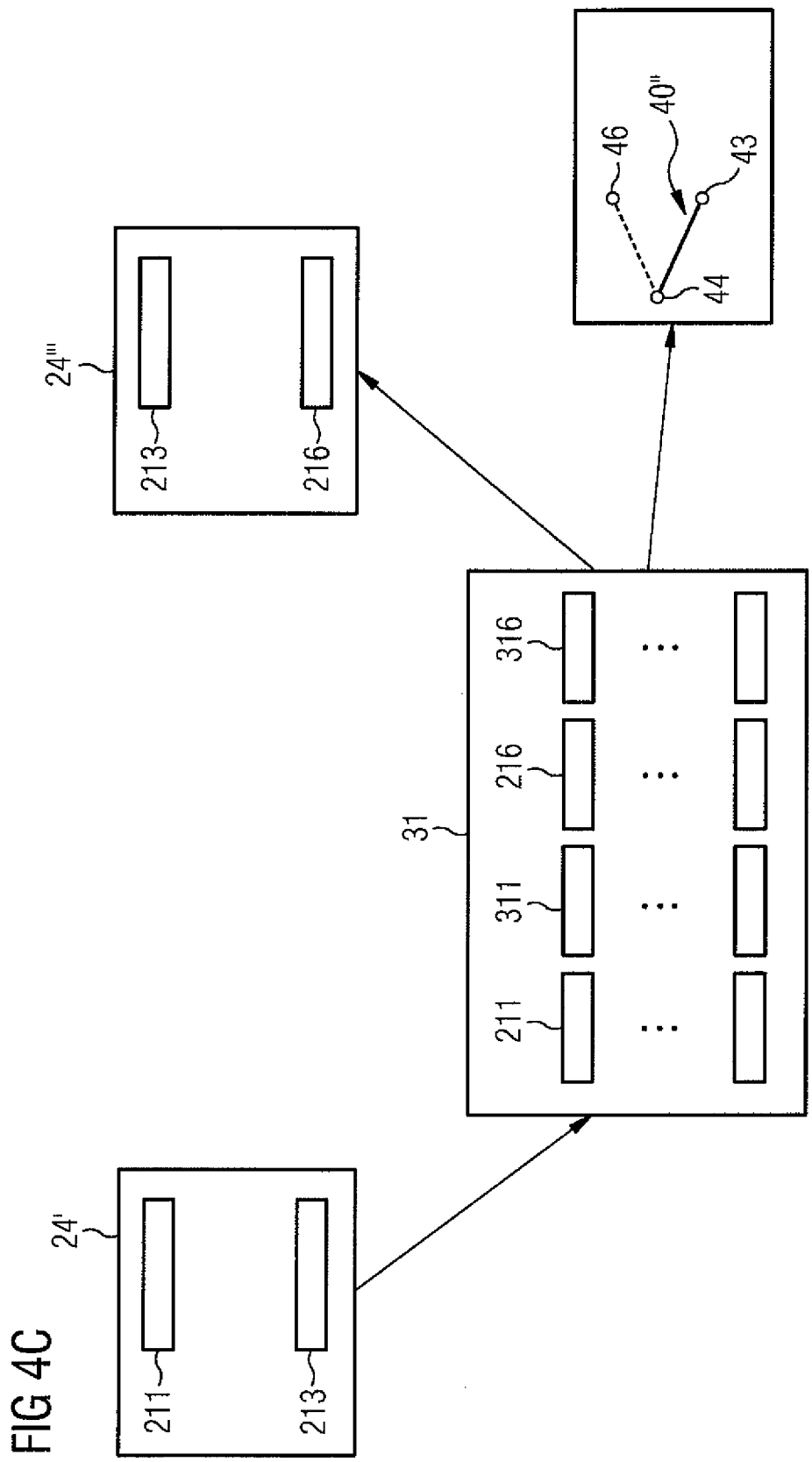

SYSTEM FOR USE IN A MOTOR VEHICLE, AND METHOD FOR EXAMINING GOODS

PRIORITY CLAIM

This is a U.S. national stage of Application No. PCT/EP2009/061609, filed on Sep. 8, 2009, which claims priority to German Application No: 10 2008 046 714.6, filed: Sep. 11, 2008, the contents of which are incorporated herein by reference.

BACKGROUND OF THE INVENTION

1. Field of the Invention

The object of the invention is a system and method as claimed in claim 4 for use in a motor vehicle, wherein the system comprises a navigation system and a control unit designed such that a list of goods, stored in the control unit, is used to generate a route of stops for the purchase of the goods.

2. Related Art

When labeling goods and products, labels which have a near-field transponder are increasingly used. It is possible, using the near-field transponders attached to the goods and products to obtain information relating to the labeled goods or the labeled products with the aid of a near-field reader or another near-field transponder. This concerns in particular the type of goods, the price and other information such as shelf-life or other information. It should be noted at this juncture that "products" and "goods" will be used as interchangeable terms in the following text.

It is possible, using a near-field reader, to identify the products located in the trolley inside, for example, a supermarket or a store, with the result that only the reader needs to be presented at the checkout or the price of the purchased products is debited from an account when the trolley passes through a gate. Such a method is described, by way of example, in US patent 2004/0103034 A1.

Furthermore, it is already known in the prior art to store in electronic form, a shopping list with products or goods to be purchased. This is frequently referred to as the "intelligent fridge", which is capable by itself of generating a shopping list with goods that are about to run out. Such a list can then be transmitted to a control unit. Devices with personal information management (PIM) software, such as, for example, cell phones or personal digital assistants (PDAs), are used nowadays as the control unit.

The list, which is often stored in electronic form, can be used in particular for purchasing all the products entered in the list in as intelligent a sequence as possible. The intention here is to prevent a situation where first a product A is purchased in a store and then another store is visited in order to purchase product B, only to then discover that the remaining product C must likewise be purchased in the first store. Document JP 2003308409 A1 discloses a method to remedy this. In the method, the user of a motor vehicle inputs the starting point and the destination point of the motor vehicle into the navigation system and transmits the list of goods to be purchased to a server. The server selects from a database a preferred location for purchasing the products to be purchased and compiles a route from the information obtained from the server, by which route the targeted stores for purchasing all the products stored on the list can be reached within the shortest possible distance or shortest possible time.

A disadvantage of this method is that once a route is compiled, it can no longer be adapted dynamically in order to react to products that are not available in one of the targeted stores.

SUMMARY OF THE INVENTION

It is the object of the present invention to provide a method and a system which do not have the aforementioned disadvantage.

The system according to one embodiment of the invention has a near-field receiver and/or near-field transponder for detecting goods in the motor vehicle. Here, the near-field receiver and/or the near-field transponder can be connected or is connected to the control unit such that a further list with detected goods can be transmitted to the control unit and the stored list is updated by the further list.

Owing to the fact that the system additionally has a dedicated near-field receiver and/or near-field transponder, it is possible after leaving a location where goods or products have been purchased to carry out a comparison to check whether all the goods on the list that are associated with a location or stop along the route were purchased. To this end, the near-field receiver and/or transponder detects the signals from the labels of the purchased goods and transmits the registered goods to the control unit which deletes the purchased goods from the stored list for the further purchase of goods. In this way the list of goods to be purchased is updated.

The system and the method are advantageous particularly if not all the goods to be purchased were purchased at a location or a stop (wherein a stop can comprise the stopping of the motor vehicle and possibly visiting of several locations such as, for example, inside a shopping mall) during the time spent at that stop. Due to the near-field receiver and/or near-field transponder, which is designed as part of the system, it is possible to detect that a product to be purchased at this location or stop was not purchased, with the result that the route displayed by the navigation system must be adapted in a manner such that either another stop is made in order to purchase the previously mentioned product that was not purchased or that the product can be purchased at another location or stop which is located along the route. The user can, of course, also do without a product to be purchased and delete the appropriate entry from the list. It is possible with the aid of the system and the method to carry out this updating process of the route dynamically, i.e. automatically with the aid of the control unit of the navigation system and the information collected by the near-field receiver and/or near-field transponder. The adapted route or the changed list is then automatically indicated to the driver. This avoids the need to worry about where else the product can be purchased or how this location can be incorporated into the compiled route in order to minimize the travel time or the travel distance if a product is not available at a stop intended therefor.

In one embodiment, the near-field receiver and/or near-field transponder is arranged, preferably fixed, in the motor vehicle. This has the advantage that the near-field receiver and/or near-field transponder cannot be left behind.

Furthermore, the connection for the control unit can be placed at a front console or into the onboard electronic system, with the result that no connection directly to the near-field receiver and/or near-field transponder must take place within physical proximity thereof.

Alternatively, the near-field receiver and/or near-field transponder can be arranged directly on the control unit.

In another embodiment of the system, the control unit comprises an onboard computer and/or a portable communications unit such as, for example, a cell phone or a PDA. If the control unit comprises an onboard computer, the information gathered and the various lists can be output directly in a display of the onboard computer in a manner visible to the driver. In the case of a portable communications unit, said unit can be carried along additionally while purchasing the goods and additional manual control can take place. Here, the control unit has at least one microprocessor designed for transferring connections or commands to the navigation system of the motor vehicle and thus for initiating the route or, if necessary, adapting it.

In a further embodiment of the method, the control unit holds a database of goods and stops associated with the goods, at which stops the goods can be purchased with preference, wherein the associated stops are ascertained preferably using a learning algorithm on the basis of previous lists of goods to be purchased and stops where the goods on the previous lists were purchased. Since in the method a learning function can be implemented and it can be checked directly in the vehicle which products were purchased at any stop or location, the system can learn which locations or stops the driver prefers for purchasing particular goods or products. It is thus possible, using a learning algorithm, for preferences which are specific to the user to be ascertained and for the database to be updated to this effect. This has the advantage that the user of the system can have a direct influence on the locations at which the goods are to be purchased. Neural networks or similar methods, for example, can be used as the learning algorithm. For a few of the methods used it is necessary for a certain number of already available lists, i.e. lists which were already used for purchasing the goods, to be stored and used to train the learning algorithm. Once the learning function has been trained, it can be dynamically adapted further by the current list. This is possible only because it is already possible to check in the motor vehicle which goods were purchased at which stop.

In a further embodiment of the method, the control unit has a further database of goods and preferred substitution products, wherein the goods contained in the list that could not be purchased at a stop or location are changed for a substitution product stored in the database and the location where it can be purchased. The generated route is subsequently adapted to the substitution goods and the stops where said goods can be purchased. Here the user of the system has the option to find alternatives for non-available products.

BRIEF DESCRIPTION OF DRAWINGS

The invention will be explained in more detail below with reference to a few exemplary embodiments. In the figures:

FIG. 1 is a schematic of a system;
FIG. 2 is a schematic of a sorting of a list and a generation of a route;
FIG. 3 is a schematic process flow;
FIGS. 4a-c are further portions of the method.

DETAILED DESCRIPTION OF THE DRAWINGS

FIG. 1 is intended to provide an overview of one embodiment of the system. The system 1 comprises a control unit 2 which—shown schematically—contains a list 20 used to generate a route for purchasing goods entered on the list 20 with the aid of a navigation system 3. Here, the route can be optimized in terms of the travel time or the travel distance.

Furthermore the control unit 2 communicates with a near-field transponder 4. If a product basket 5 is placed into the motor vehicle after the purchasing operation at one location, wherein the product basket 5 contains the products 50, 51 and these products are fitted with labels that can be read by the near-field transponder 4, an inventory is taken of the goods present in the product basket 5 by the near-field transponder 4 and the result is transmitted to the control unit 2. Subsequently, the list 20 is updated in a manner such that the goods already purchased, i.e., 50, 51 are deleted from the list and, if necessary, the further route is adapted for the purchase of articles that were not available at the first location. The control unit 2 present is a PDA, which has access to communications networks such as, for example, the Internet and is connected, or can be connected, to an onboard computer in the motor vehicle. If the computational power of the PDA does not suffice, parts of the calculation of the route or the databases can be stored or calculated in a further data processing system.

Initially, FIG. 2 is intended to be used to illustrate the generation of a route by list 21. A list 21 that is initially unsorted comprises product entries 211-214. A database 30 containing locations 311-315 which are associated with product entries 211-215 is used to generate a sorted list 22, in which the sequence of the product entries was changed and grouped. Furthermore, the navigation system 3 is used to generate a route 40, starting from starting point 41. First, the first entry in the sorted list 22, i.e. the product of product entry 214, is intended to be purchased at the nearest route point 42. Both the products of product entries 211 and 213 are intended to be purchased at a further stop 43. Finally, the product of product entry 212 is intended to be purchased at a last stop 44. The database can here be stored and continuously updated in the control unit, such as, for example, a PDA or the onboard computer of a motor vehicle. In this way it is possible to store the database 30 initially without parameters and to dynamically build the database over the course of a plurality of processed lists for purchasing goods. It is possible thereby to address personal preferences of the user of the system. However, it is also possible to already configure the database in advance and subsequently include, if appropriate, learning algorithms.

Once the unsorted list 21 of the control unit is changed into the sorted list 22 and the route 40 is transmitted to the navigation system 3, the user of the system can move from stop 41 to stop 42.

FIG. 3 shows schematically the sorted list 22 before the goods are purchased and an updated list 24 after the goods have been purchased. As already mentioned in connection with the description of FIG. 2, the product of the product entry 214 is intended to be purchased at stop 42. Once the user has completed the purchase of the product, the product is placed into the product basket 5' of the vehicle 10. The near-field transponder 11 fixed in the vehicle 10 detects that the product associated with the product entry 214 is located in the product basket 5' and transmits this information to the control unit 2' in the form of a further list 23, which contains the product entry 214. As a result, the sorted list 22 is updated, with the updated list 24 no longer containing the product entry 214.

Subsequently, the user of the system moves, as shown in FIG. 4a, from stop 42 to stop 43, with the updated list 24 forming the sorted list 22'. After the purchase of goods, the near-field transponder 11 (not shown in FIG. 4a) detects that only the product of product entry 213 was purchased, and transmits this further list 23' to the control unit 2'. The list 24' which is thus updated now not only comprises the product of product entry 212, which must still be purchased at stop 44, but also the product of product entry 211 which was not purchased at stop 43.

FIG. 4b is intended to be used to illustrate how a further updated list 24", and a resulting adapted route 40', is generated on the basis of the updated list 24'. Initially, the product entry 211 is transmitted again to the database 30, and a check is carried out whether the location 311 is unique or whether other locations where the product of the product entry 211 can be purchased are stored in the database 30. In the case that is illustrated schematically in FIG. 4b, the location 311 contains an alternative to stop 43. The list 24″ that is thus updated furthermore contains the product entries 211 and 213 in the same order as the updated list 24′, but the product of the product entry 211 is now intended to be purchased at the stop 45, which was newly added to the route, rather than at stop 43. This adapted route 40′ now extends from stop 43 to stop 45, where the product of the product entry 211 is intended to be purchased, and subsequently to stop 44, at which, as before, the product of the product entry 213 is intended to be purchased.

Alternatively, it is possible to use, as illustrated in FIG. 4c, a further database 31, which contains not only the product entries and the associated locations 211 and 311 but also further product entries 216, associated with the product entries, for substitution products, with the substitution products likewise being associated with a location for handling the purchase 316. If the updated list 24′ transmits the product entry 211 to the database 31, which can be logically combined with the database 30, the product entry 211 is replaced in the updated list 24‴ by the product entry 216 of the substitution product. However, due to the other location 316 associated with the product entry 216, the order of the product entries in the updated list 24‴, compared to the updated list 24′, is changed, i.e. first the product entry 213 and only then the product entry 216 is listed. The resulting adapted route 40″ first runs from stop 43 to stop 44, where the product of the product entry 213 is intended to be purchased, and then to another stop 46, where the product of the product entry 216, which substitutes the product of the product entry 211, can be purchased.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for use in a motor vehicle comprising:
a navigation system;
a control unit configured such that a list of goods stored in the control unit is used to generate a route of stops for the purchase of the goods, the route being displayed by the navigation system;
at least one of a near-field receiver and a near-field transponder connectable to the control unit and configured to detect goods present in the motor vehicle, wherein a further list is generated that includes the detected goods present in the motor vehicle,
wherein the further list is transmitted to the control unit and the stored list is updated to remove from the stored list the detected goods.

2. The system as claimed in claim 1, wherein the at least one of the near-field receiver and the near-field transponder is arranged in the motor vehicle.

3. The system as claimed in claim 1, wherein the control unit comprises at least one of an onboard computer and a portable communications unit.

4. The system as claimed in claim 2, wherein the at least one of the near-field receiver and the near-field transponder is fixed in the motor vehicle.

5. A method for monitoring goods with a system comprising:
a navigation system;
a control unit configured such that a list of goods stored in the control unit is used to generate a route of stops for the purchase of the goods, the route displayable by the navigation system;
at least one of a near-field receiver and a near-field transponder connectable to the control unit and configured to detect goods present in the motor vehicle, the method comprising:
transmitting the list of goods to be purchased to the control unit;
generating the route that is adapted to the list of goods to be purchased;
displaying the route that provides at least one stop for the purchase of the goods to be purchased by the navigation system;
comparing the goods purchased at the at least one stop determined by the at least one of the near-field receiver and the near-field transponder with the list of goods to be purchased by the control unit and updating the list of goods to be purchased by removing the detected goods from the list of goods to be purchased.

6. The method as claimed in claim 5, wherein the control unit comprises a database of the goods and respective stops associated with the goods, at which respective stops the goods are purchased,
wherein the associated stops are ascertained using a learning algorithm based at least in part on previous lists of goods to be purchased and stops where the goods on the previous lists were purchased.

7. The method as claimed in claim 5, wherein the control unit comprises a database of the goods and preferred substitution products, and the goods to be purchased in the list that are not detected by the at least one of the near-field receiver and the near-field transponder after the comparison can be partially replaced by the preferred substitution goods and the generated route can be adapted to the substitution goods.

8. The method as claimed in claim 6, wherein the control unit comprises a further database of the goods and preferred substitution products, and the goods to be purchased in the list that are not detected by the at least one of the near-field receiver and the near-field transponder after the comparison can be partially replaced by the preferred substitution goods and the generated route can be adapted to the substitution goods.

* * * * *